July 10, 1962    C. M. STEVENS    3,043,971
IMPROVED LAMINATED FRAME AND METHOD OF MAKING SAME
Filed Aug. 1, 1956
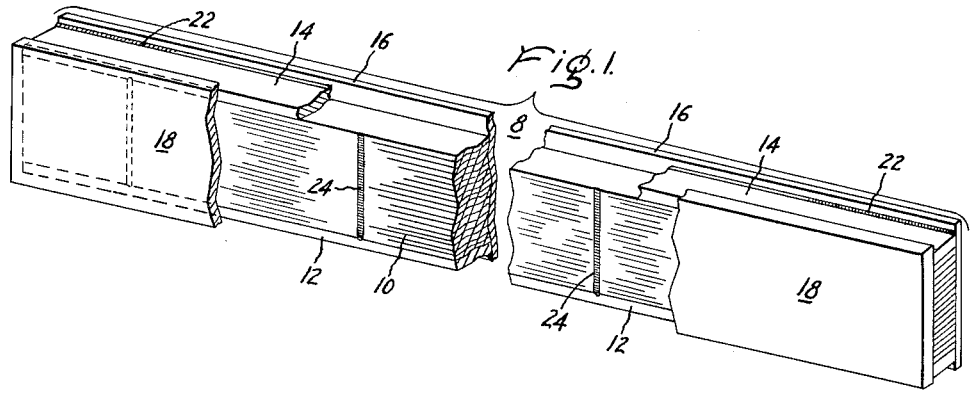
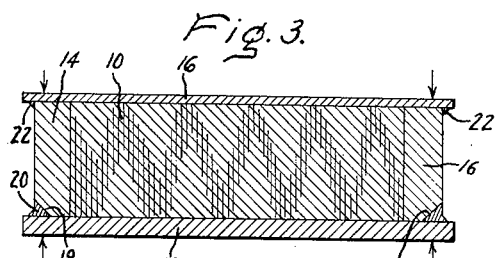
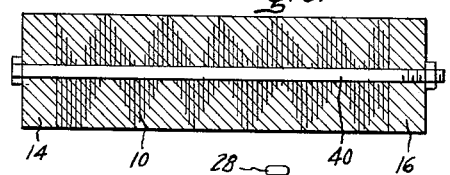
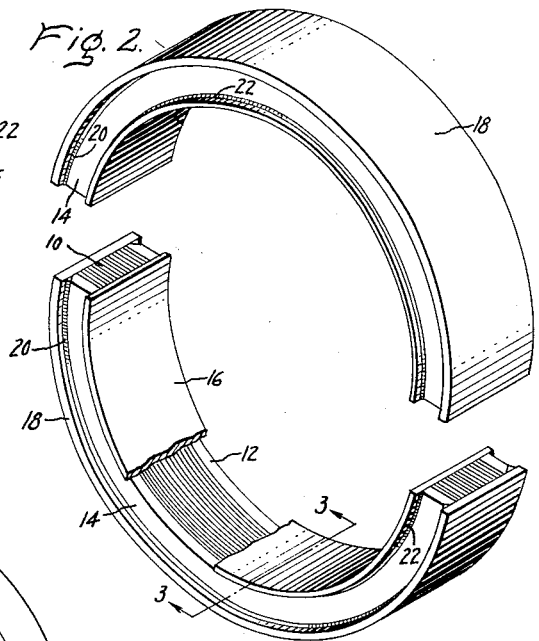
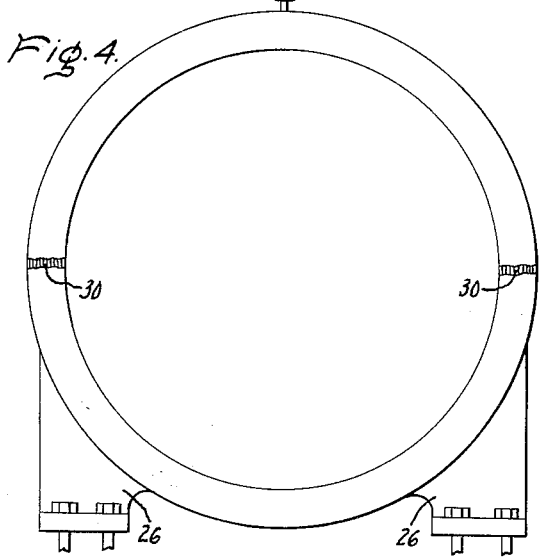
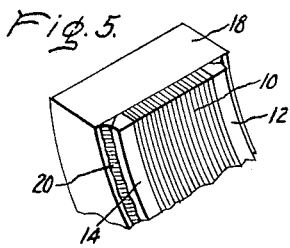
Inventor:
Clarence M. Stevens,
by Vernon F. Kalb
His Attorney.

United States Patent Office 3,043,971
Patented July 10, 1962

3,043,971
IMPROVED LAMINATED FRAME AND METHOD OF MAKING SAME
Clarence M. Stevens, Schenectady, N.Y., assignor to General Electric Company, a corporation of New York
Filed Aug. 1, 1956, Ser. No. 601,576
8 Claims. (Cl. 310—216)

The invention described herein relates to a method of manufacturing a laminated frame of a type adapted for use in electrical apparatus, such as dynamoelectric machines and particle accelerators, including cyclotrons, synchrotrons and the like. The principal step performed in practicing this new method consists in the edgewise bending of a plurality of stacked laminations in a single operation to form the core portion of the frame used in such electrical apparatus.

As indicated in the preceding paragraph, the invention is broadly applicable to electrical equipment utilizing laminated frames, and in order to simplify the disclosure, the following description will be confined to a dynamoelectric machine, and in particular, a D.-C. motor, although it is to be understood that the principles equally apply to such other apparatus.

The normal construction of a stator for a direct current motor consists of a frame or magnetic core made of solid material on which field coils are mounted for creating the magnetic fields effective in obtaining machine operation. This type of construction is suitable for most applications requiring a rugged and efficiently performing machine but certain industrial operations also demand a motor capable of being reversed rapidly so as to speed up the manufacturing processes or other functions being performed. Reversal of a motor of the solid frame type can be obtained readily but not with the rapidity now being required in modern manufacturing processes. The reason for this is the characteristics of a D.-C. machine are such that when there is a great change in load or current in the machine, undesirable eddy currents are produced in the solid frame portion, voltage response becomes poor and in the event the load current is changed to an extent where the commutating pole flux does not change at substantially the same rate, the machine will not commutate properly and sparking is produced at the commutator.

Recognizing these problems, manufacturers accordingly resorted to the substitution of laminations for the solid frame material which substantially eliminated the aforementioned disadvantages inherent in the solid frame machines. However, the desired characteristics present in the laminated type are obtained at the sacrifice of economy in manufacture because the laminations must be punched from stock material which results in excessive wastage. It has been estimated that the amount of excess material remaining after punching a single lamination is in the order of 20–25% when using the most economical size sheet possible. It therefore is apparent that if the stator laminations could be formed simultaneously to a circular configuration from straight, flat pieces of material of a thickness and width adapted for use in the frame, it would eliminate the burdensome cost now imposed on manufacturers in providing machines of the laminated type.

My invention is directed to such a process and has for its principal object the provision of a method whereby a laminated frame is formed by the simultaneous bending of a plurality of stacked laminations for providing a rigid stator of sound mechanical construction and having excellent electrical characteristics.

Another object is to provide a frame made in accordance with the above-mentioned method.

In carrying out my invention, I subject a plurality of stacked laminations to great pressure and enclose them within plates welded together to retain the pressure therein. This assembly is heated and rolled into the shape of a semicircle and thereafter milled to provide smooth surfaces for joining with an identical half made by the same process to form the circular stator frame. The plate appearing on the inner peripheral portion of the frame is then removed to expose the edges of laminations making up the stack.

The subject matter which I regard as my invention is particularly pointed out and distinctly claimed in the concluding portion of this specification. My invention, however, both as to organization and method, together with further objects and advantages thereof, may best be understood by reference to the following description taken in connection with the accompanying drawing in which:

FIGURE 1 is a perspective view, partly broken away, illustrating the position of stacked punchings within a pluraltiy of plates prior to rolling;

FIGURE 2 is a perspective view, partly in section, illustrating the shape of each half frame after the rolling process has been completed;

FIGURE 3 is a view taken on lines 3—3 of FIGURE 2;

FIGURE 4 is an end view of an assembled stator immediately prior to the installing of field coils; and FIGURE 5 is a partial view of a modified frame made in accordance with the invention.

FIGURE 6 is a sectional view of still another modification.

Referring now to the drawing wherein like reference characters designate like or corresponding parts throughout the several views, there is shown a preferred embodiment comprising an assembly 8 having a plurality of stacked laminations 10 bounded by upper and lower end plates 12 and 14 respectively welded on adjacent sides to a sacrifice plate 16 and wrapper plate 18. As shown in FIGURE 3, each end plate is milled at an angle 19 to provide a relatively large area for accepting a weld 20 utilized in firmly anchoring the end plates to the wrapper plate 18; conventional weld 22 being employed for securing the sacrifice plate to the assembly. The size of the assembly is such that the exterior dimensions correspond generally to the developed dimensions of a finished half frame.

The following process is employed in assembling the preferred structure illustrated in FIGURE 1:

The sacrifice plate 16 is placed in a fixture or other receptacle and then welded to the end plate 12 positioned at right angles thereto. Laminations 10 are each painted with a coating of magnesium oxide, or other material effective in preventing the various laminations from fusing together when subjected to heat, and stacked on the end plate 12 until the desired height is reached, whereupon the upper end plate 14 is placed in the position shown to complete the stacking process. With the stacked laminations thus assembled, a plurality of jacks (not shown) are spaced along the length of the assembly and arranged to compress the end plates and laminations to a pressure in the neighborhood of 30 tons, although this pressure is not critical. It will be noted that at this stage of assembly, the wrapper plate 18 is not in position.

In order to prevent subsequent movement of the laminations 10, a plurality of grooves 24 are chipped along the vertical stack at spaced intervals and subsequently filled with weld material for positively joining all laminations into a compact unit. These welds are preferably located at a point between poles adapted for attachment to the inner peripheral surface of the stator frame, and effectively serve the function of preventing loosening of the laminations when bolt holes are drilled through the frame for fixing the poles in a predetermined position.

After the welds have been ground flush, the wrapper plate 18 is placed against the exposed surfaces of the laminations and tack welded to the end plates at various points along the length of the assembly. Complete welds are then made at the junction of the several plates thereby arriving at an assembly sealed on all sides except for the ends which remain exposed. Since the pressure previously imposed on the end plates 12 and 14 and laminations 10 is now contained within the assembly, the jacks can be removed without relieving the pressure or disturbing the alignment of parts.

With the laminations enclosed in the aforesaid manner, the assembly is annealed by subjecting it to a slow-rising temperature for approximately 3 hours until the oven reaches 1150° C. whereupon it is removed and immediately rolled to the configuration of a semicircle. Obviously, the size of the stator desired, and therefore the assembly, will dictate the length of time and temperature necessary for obtaining complete annealing. The rolling of the assembly is performed in a manner to obtain edgewise bending of the end plates and stacked laminations positioned therein, thereby converting the rectangular assembly to the semicylindrical shape. The laminated edges accordingly lie in a plane passing through the inner and outer peripheral surfaces of the semicylinder formed, as shown in FIGURE 2, and in the finished condition, the frame appears as though the laminations were punched and merely stacked on one another as in the prior practice.

The above-described process is repeated to form an identical semicylindrical half and at this stage of manufacture, the halves assume the rough, unfinished condition shown in FIGURE 2.

In order to prepare the rolled assemblies for joining and installation of field coils, the excess material on each end of each assembly is cropped or cut off and the remaining surface machined to a smooth finish. The assemblies are then secured together, as by welding, although other connecting means may be used, to form a cylinder comprising the frame or magnetic core for the motor. Feet 26 and lift lugs 28 are respectively attached to the base and top of the frame as in usual practice.

It will be evident to those skilled in the art that the sacrifice plate must be removed to provide an effective magnetic circuit in the frame, and in this preferred embodiment, the sacrifice plate is cut out by conventional machining operations. In the alternative, the end plates 12 and 14 can be faced immediately after cropping and machining the ends, thereby removing weld 22 and part of weld 20, thus making it possible to extract the sacrifice plate without having to resort to machining operations. In some assemblies, it may be necessary to chip a groove along the width of the wrapper plate to facilitate removal with crow bars.

Reference to FIGURE 3 will show the relative size of welds 22 and 20, the latter being made larger to assure attachment of the wrapper plate 18 to end plates 12 and 14 after the end plates have been faced to a smooth finish. The arrows in FIGURE 3 point to the approximate depth of cut taken in the side plates when machining them to the finished condition. Upon completion of the above-described machining operations, the frame is sufficiently finished to receive the additional elements necessary for forming a complete stator.

It has been determined that the relative size of the sacrifice and wrapper plates need not be in the proportion illustrated in the drawing. They may be of the same size for example, but a sacrifice plate of lesser thickness is used since it is more economical.

Transient flux characteristic tests performed on a variety of sizes of machines constructed in accordance with the above-described process have shown that the frame is a truly laminated structure. The oxide coating of magnesium placed on each surface of the laminations is effective in preventing fusing of the laminations together when the assembly is subjected to heat and the forces encountered during the rolling operation. In order to relieve any stresses residing in the halves of the stator, they may be annealed prior to being welded or otherwise connected into an integral unit.

The above-described process, as previously mentioned, is the preferred method of forming the stator frame and specific steps are recited to enable those skilled in the art to understand and practice the invention. However, it is to be understood that I am not limited to the specific process disclosed. The novel concept resides in bending a plurality of laminations edgewise, and obviously, many of the exact steps disclosed are not absolutely essential to successfully obtaining a laminated frame. For example, all of the end, wrapper and sacrifice plates are not necessary since the primary function they serve is to contain the laminations in a housing to facilitate rolling of the assembly. Referring to FIGURE 6, it will be seen that bolts 40 can be utilized for holding the laminations together and end plates 12 and 14 may be used if desired to conveniently provide a firm surface for the bolts to engage and to assist in holding the laminations in place.

Further, the various steps of heating may be eliminated and the specific temperature recited is not critical since the assembly may be cold rolled and this is especially applicable to small machines where great forces are not encountered. Likewise, the application of pressure to the laminations prior to rolling could be eliminated but present embodiments indicate that the use of pressure is advantageous.

Again, the specification discloses making the frame in a semicircle. It is believed well within the scope of the invention to construct the frame of a plurality of arcs of a circle in cases where the stator may assume a size necessary to resort to this type construction, or where other obvious benefits are obtainable by assembling the frame in sections.

In the design of some motors, it may be desirable to provide a laminated path only for the steady and transient commutating pole flux. Referring to FIGURE 5, it will be seen that this is accomplished by making the wrapper plate 18 of a thickness equal to or greater than the width of the laminations 10, the latter portion of the frame being used for carrying the commutating pole flux thereby to achieve good commutating properties in the machine.

In lieu of constructing a pair of laminated assemblies and joining them to form the frame, the assembly, including the laminations and enclosing plates, may be rolled to form a circle. Prior to joining the juxtaposed ends which are now adjacent one another, the end surfaces are made smooth and then jacked or otherwise moved toward one another and either welded or bolted together to complete the frame. The jacking or other moving process creates considerable tension in the cylindrical frame when the adjacent ends are welded together, but it may be removed conveniently by annealing the frame a second time prior to commencing the step of extracting the sacrifice plate.

It will be apparent that many modifications and variations are possible in light of the above teachings. The novel concept resides in the edgewise bending of stacked laminations and only a preferred embodiment has been disclosed illustrating how such bending may be carried out. Further, in order to eliminate any crimping or buckling of the sacrifice plate and laminations on their inner peripheral surface, appropriately sized blocks may be inserted between the end plates and laminations on a side adjacent the wrapper plate. It is therefore to be understood that within the scope of the appended claims, the invention may be practiced otherwise than as specifically described.

What I claim as new and desire to secure by Letters Patent of the United States is:

1. The method of forming a laminated frame comprising the steps of enclosing a plurality of stacked laminations in an open ended box to form a rigid assembly, heating said assembly and thereafter rolling it in a direction edgewise of said laminations to form a half frame of semicircular configuration, repeating the above-described process to form an identical semicircular half, removing a side of said box located on the inner peripheral surface thereof for exposing the edges of said laminations, and joining said halves to form said frame.

2. The method of manufacturing a laminated stator frame for a dynamoelectric machine comprising the steps of assembling a plurality of laminations on an even stack to form a core of electrically conductive material, subjecting said stack of laminations to a pressure applied in a direction urging said laminations together and thereafter enclosing said core to retain the pressure applied thereto, heating said assembly and thereafter rolling it in a direction edgewise of said laminations to form a stator half of semicircular configuration, repeating the above-described process to form an identical semicircular half, removing a portion of the enclosure on the inner peripheral surface of said frame to thereby expose said laminations, and joining said halves to form the stator frame for said machine.

3. The subject of forming a laminated stator frame for a dynamoelectric machine comprising the steps of coating each of a plurality of laminations with an oxide capable of preventing fusion of the laminations when subjected to heat and to stresses resulting from working said laminations, assembling said laminations into a consolidated mass and subjecting said mass to pressure, fastening the edges of said laminations together at spaced intervals along their length for preventing relative movement therebetween, enclosing said mass with a plurality of plates to form an assembly, heating said assembly and thereafter rolling it in a direction edgewise of said laminations to form a stator half of semicircular configuration, repeating the above-described process to form an identical semicircular half, removing said plates appearing on the inner peripheral surface of said stator frame, and joining said halves to form the stator frame for said machine.

4. The method of forming a laminated stator frame for a dynamoelectric machine comprising the steps of stacking a plurality of oxide coated laminations on a first pair of plates welded at right angles to one another, placing a third plate on top said laminations, applying pressure to said stack of laminations and welding the edges thereof together at spaced intervals along their length for preventing subsequent movement therebetween, completing the enclosing of said laminations to form a rigid assembly, heating said assembly and thereafter rolling it in a direction edgewise of said laminations to form a stator half of semicircular configuration, repeating the above-described process to form an identical semicircular half, removing said plates on the inner peripheral surface of said frame thereby to expose said laminations, and joining said halves to form the stator frame for said machine.

5. A stator frame for a dynamoelectric machine comprising a plurality of arc-shaped assemblies joined together to form a circular frame, each of said assemblies comprising a plurality of stacked laminations bent edgewise and having means affixed thereto for retaining said laminations in position.

6. A stator frame for a dynamoelectric machine comprising a plurality of laminations bent edgewise and partially enclosed within a plurality of plates for forming a first assembly of semicircular configuration, said plates being constructed and arranged to provide strength and rigidity to said assembly, a second assembly constructed identically to said first assembly, and means connecting the free ends of said first and second assemblies to form the stator frame for said machine.

7. A laminated stator frame comprising a plurality of edgewise bent laminations having plates on opposite sides thereof, a wrapper plate connected between said plates and having a surface in intimate contact with edges of said laminations resulting from simultaneously bending said plates, wrapper plate and laminations in forming a first assembly of semicircular configuration, a second semicircular assembly of the same construction attached to said first assembly thereby forming the frame for said machine.

8. The combination according to claim 7 wherein said wrapper plate is of a thickness greater than said laminations.

References Cited in the file of this patent
UNITED STATES PATENTS

| | | |
|---|---|---|
| 2,368,163 | Schukraft | Jan. 30, 1945 |
| 2,446,999 | Camilli | Aug. 17, 1948 |
| 2,456,458 | Somerville | Dec. 14, 1948 |
| 2,467,868 | Somerville | Apr. 19, 1949 |
| 2,548,628 | Somerville | Apr. 10, 1951 |
| 2,774,000 | Ross | Dec. 11, 1956 |
| 2,830,209 | Fleckenstein | Apr. 8, 1958 |